Dec. 9, 1924.
J. F. JOHNSTONE ET AL
1,518,932
CHILD'S VEHICLE
Filed Dec. 5, 1923
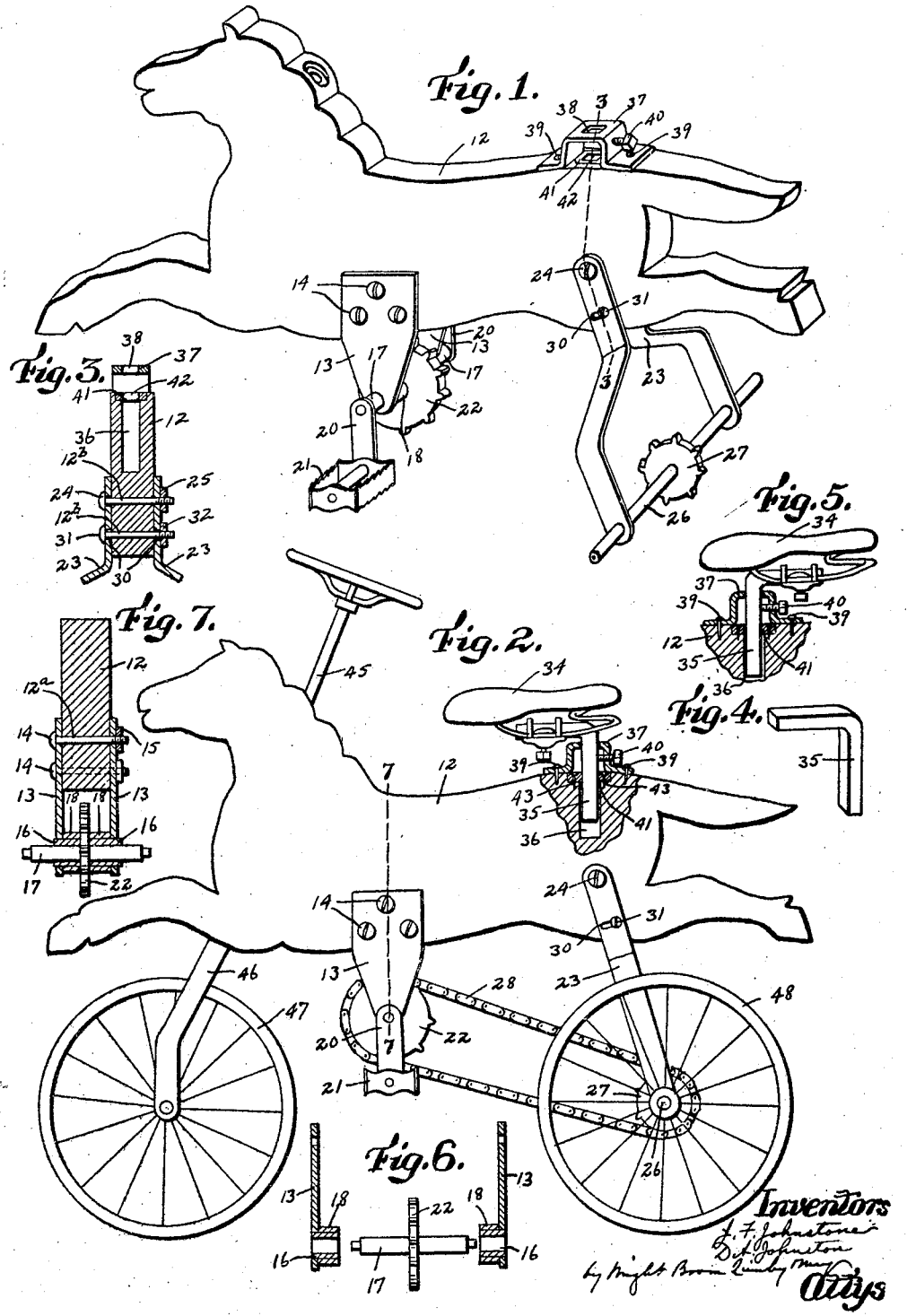

Patented Dec. 9, 1924.

1,518,932

UNITED STATES PATENT OFFICE.

JACKSON F. JOHNSTONE, OF BOSTON, AND DAVID A. JOHNSTON, OF MELROSE, MASSACHUSETTS.

CHILD'S VEHICLE.

Application filed December 5, 1923. Serial No. 678,726.

*To all whom it may concern:*

Be it known that we, JACKSON F. JOHNSTONE and DAVID A. JOHNSTON, citizens of the United States, residing at Boston and Melrose, respectively, in the counties of Suffolk and Middlesex and State of Massachusetts, have invented new and useful Improvements in Children's Vehicles, of which the following is a specification.

This invention relates to a child's vehicle of the tricycle type, comprising a flat-sided body fashioned to resemble a horse or other animal, when the body is viewed from either side, a saddle supported by the body, hanger plates projecting downward from the forward portion of the body, and supporting a crank-shaft which is rotatable by a rider on the seat, standards projecting downward from the rear portion of the body and engaging a driving axle having a pair of rear wheels, and a steering-post journaled in the forward portion of the body and having a fork in which the axle of a steering wheel is journaled, the crank-shaft and axle being provided with sprocket wheels which are connected by a sprocket chain.

The invention is embodied in certain improvements in the construction of a vehicle of this character including a body made of wood, or other light and inexpensive material, whereby sufficient strength, stability and durability are imparted, and whereby certain desirable adjustments are permitted.

Of the accompanying drawings forming a part of this specification,—

Figure 1 is a perspective view showing the body, the hanger plates, the crank-shaft, the standards, the rear axle, and the means whereby the saddle-post-receiving portion of the body is reinforced, the saddle and its post, the sprocket chain, the rear wheels and the steering-post and the steering-wheel being omitted.

Figure 2 is a side view, showing the entire vehicle, parts being shown in section.

Figure 3 is a section on line 3—3 of Figure 1.

Figure 4 is a perspective view of the saddle-post shown by Figure 2.

Figure 5 is a view similar to a portion of Figure 2, showing the steering-post reversed.

Figure 6 shows, in section, the hanger plates removed from the body, and, in elevation, the crank-shaft without its cranks.

Figure 7 is a section on line 7—7 of Figure 2, omitting the cranks and pedals.

The same reference characters indicate the same parts in all of the figures.

In the drawings, 12 designates a flat-sided elongated body, preferably composed of wooden planking about two inches thick, the sides of the body being substantially parallel. In the forward portion of the body are formed a group of transverse bolt holes 12$^a$, one of which is shown by Figure 7. Seated on the sides of the body, and projecting downward from the forward portion thereof, are two hanger plates 13, attached to the body by clamping bolts 14, passing through the holes 12$^a$, said bolts having heads bearing on the outer side of one of the plates. In this instance, the bolts have nuts 15 (Figure 7) bearing on the outer side of the other plate, although, instead of the nuts, the ends of the bolts opposite the heads may be upset like the ends of rivets.

The hanger plates are spaced apart by the body and their lower portions are provided with inwardly projecting sleeves 16, fixed in openings in the plates and constituting bearings for a crank-shaft 17. The sleeves or bearings 16 are preferably provided with collars or enlargements 18, fixed thereto and contacting with the inner sides of the hanger plates, as shown by Figure 6. The plates 13 are widened at their upper ends, so that they contact with considerable areas of the body sides and reinforce the latter when attached thereto by the plurality of clamping bolts 14 shown by Figures 1 and 2, hence the portion of the body on which the plates are seated is not liable to be split by strain exerted on the crank-shaft.

In assembling the described parts, the end portions of the crank-shaft, minus the usual cranks 20 and pedals 21, is inserted in the bearings. The hanger plates 13 are then bolted to the body, the arrangement being such that when the plates are secured, the inner ends of the bearings contact, as shown by Figure 7, with opposite sides of a sprocket wheel 22, fixed to the crank-shaft, and prevent endwise motion of the crank-shaft in the bearings. The end portions of the crank-shaft now project outward from the bearings, as shown by Figure 7, so that the cranks 20 may be secured thereto by any suitable means. This construction permits a quick and convenient assemblage of the parts and ensures a secure confinement of the crank-shaft in its operative position.

Movably secured to the rear portion of the body are standards 23, the upper portions of which are offset inwardly and seated on the flat sides of the body. The said upper portions are secured to the body by clamping bolts through transverse bolt holes 12$^b$ (Figure 3), there being a group of two of these bolt holes in the rear portion of the body. One clamping bolt is a pivot bolt 24, pivotally connecting the upper ends of the standards to the body. The head of the pivot bolt bears on the outer side of one of the standards. The pivot bolt is provided with a clamping nut 25, bearing on the outer side of the other standard. The lower ends of the standards are provided with bearings of any suitable construction, in which is journaled a rear axle 26, having a sprocket wheel 27, fixed to its central portion. A sprocket chain 28 connects the crank-shaft and rear axle sprocket wheels.

It is well known that when a sprocket chain has been subjected to wear, its joints become loosened. The described pivotal connection between the upper ends of the standards 23 and the body, enables the standards to swing rearward at their lower ends, and thus adjust the rear axle and its sprocket wheel to take up slack in the chain due to wear of its joints.

We utilize another clamping bolt 31 to positively secure the standards in any adjusted position. The bolt 31 passes through another bolt hole 12$^b$ and through transverse slots 30 in the portions of the standards which are seated on the sides of the body.

The head of the bolt 31 bears on the outer side of one of the standards, the bolt being provided with a clamping nut 32, bearing on the outer side of the other standard. The relative arrangement of the bolts 31 and 24 is such that when the chain is unworn, the bolt 31 is at the rear ends of the slots 30, as shown by Figures 1 and 2. When the chain becomes elongated by wear, the nut 32 may be loosened and the lower ends of the standards swung backward until the chain is tightened, a very slight backward movement being sufficient. The tightening of the nut secures the standards in their adjusted position. This operation may be repeated from time to time during the life of the vehicle. The upper end portions of the standards, clamped by the bolts 24 and 31 against the flat sides of the body, reinforce the portions of the body on which they are seated.

The saddle 34 may be of any suitable construction and is provided with a post 35. To enable a portion of the post to be contained within the body 12, so that the saddle may be located close to the body when in its lowest position, we form a vertical bore 36, in the upper edge of the body, adapted to receive the lower portion of the post, as shown by Figure 2. This bore weakens the portion of the body immediately under the saddle, and we therefore provide reinforcing guides as next described, supporting and directing the movements of the post, and preventing the splitting of the bored portion by strain exerted on the post.

37 designates a metallic guiding and reinforcing member having a raised central portion, containing a guiding orifice 38, in which the post 35 has a sliding fit, the orifice being in alinement with the bore 36. The member 37 has two ears secured to the body 12 by screws 39. The member 37 prevents strains exerted on the post by the weight of the rider, from being transmitted to the bored portion of the body and splitting the same. The post is preferably square in cross section, and the orifice 38 is similarly formed, so that the post and saddle are prevented from turning. The member 37 is provided below the orifice 38 with a set screw 40, adapted to be set up against the post, as shown by Figure 2, and thus support the post at different heights. Provision is thus made for permitting a wide range of vertical adjustment of the saddle, the bore 36 enabling the saddle to be depressed into close proximity to the body, and the guide member 27 enabling the saddle to be elevated until its post is practically withdrawn from the body.

To additionally reinforce the body at its bored portion, and additionally guide the saddle post, we provide the body with a reinforcing bushing 41, inserted in an enlargement of the bore 36, and provided with a guiding orifice 42 in alinement with the orifice 38. The bushing is secured to the body by screws 43. The member 37 and the bushing 41 guide and laterally support the saddle post both above and below the set screw.

The described post-guiding and supporting means may be used with a post of the angular form shown by Figures 2, 4 and 5, and permits the post to be supported with its horizontal arm, to which the saddle is clamped, projecting forward, as shown by Figure 2, or backward, as shown by Figure 5.

When the horizontal arm projects backward, the saddle is at a maximum distance from the crank-shaft.

The vehicle includes a steering post 45, having a fork 46 and a steering wheel 47.

The rear axle is provided as usual, with a pair of rear wheels 48, one of which is fast and the other loose on the axle.

The described construction is such that the wooden body constitutes an element of a vehicle of adequate strength, stability and durability, and not undesirably heavy, the vehicle being capable of the various adjustments described.

The clamping bolts passing through the body and confining portions of the hanger plates and the standards thereagainst, contribute materially to the strength and durability of the vehicle.

We claim:

1. A child's vehicle comprising an elongated body having flat sides and two groups of transverse bolt holes below its upper edges, one group being in the forward portion and the other in the rear portion of the body; a pair of crank-shaft supporting hanger plates seated on the flat sides; clamping bolts passing through the forward group of bolt holes and attaching the hanger plates to the forward portion of the body; a pair of rear axle-engaging standards seated on said sides; and clamping bolts passing through the rear group of bolt holes and attaching the standards to the rear portion of the body, there being two bolt holes in the said rear group, one of the standard attaching bolts being a pivot bolt on which the standards are adapted to swing and adjust a rear axle engaged therewith, the other bolt passing through slots in the standards and being provided with a clamping nut, whereby the standards and axle may be confined at different adjustments.

2. A child's vehicle comprising an elongated body having flat sides, two groups of transverse bolt holes below its upper edge, one group being in the forward portion and the other in the rear portion of the body, and a vertical post-receiving bore extending downward from the upper edge of the body; a pair of crank-shaft supporting hanger plates seated on the flat sides; clamping bolts passing through the forward group of bolt holes and attaching the hanger plates to the forward portion of the body; a pair of rear axle-engaging standards seated on said sides; clamping bolts passing through the rear group of bolt holes and attaching the standards to the rear portion of the body; and metallic reinforcing means attached to the upper edge of the body and adapted to vertically guide and laterally support a saddle post entering said bore, so that strain exerted on the post is prevented from splitting the bored portion of the body.

3. A child's vehicle substantially as specified by claim 2, said reinforcing means including a member having a post-guiding orifice in alinement with said bore and spaced above the upper edge of the body, and a set screw below said orifice, adapted to confine a post at different heights.

4. A child's vehicle substantially as specified by claim 2, said reinforcing means including a member having a post-guiding orifice in alinement with said bore, and spaced above the upper edge of the body, and a bushing inserted in the mouth of said bore and having a post-guiding orifice.

5. A child's vehicle substantially as specified by claim 2, said reinforcing means including a member having a post-guiding orifice in alinement with said bore, and spaced above the upper edge of the body, and a bushing inserted in the mouth of said bore and having a post-guiding orifice, said member being provided with a set screw located between the guiding orifices and adapted to confine a post at different heights.

6. A child's vehicle comprising an elongate body having flat sides and a group of transverse bolt holes in its forward portion below its upper edge; a pair of hanger plates seated on the flat sides; and clamping bolts passing through said bolt holes and attaching the hanger plates to the forward portion of the body, the lower ends of the hanger plates being provided with inwardly projecting bearing sleeves adapted to contact at their inner ends with opposite sides of a sprocket wheel on a crank-shaft journaled in said sleeves, so that the sleeves prevent endwise movement of the crank shaft.

In testimony whereof we have affixed our signatures.

JACKSON F. JOHNSTONE.
DAVID A. JOHNSTON.